(12) United States Patent
Swarbrick et al.

(10) Patent No.: US 9,489,304 B1
(45) Date of Patent: Nov. 8, 2016

(54) BI-DOMAIN BRIDGE ENHANCED SYSTEMS AND COMMUNICATION METHODS

(71) Applicant: Marvell International Ltd., Hamilton (BM)

(72) Inventors: Ian Swarbrick, Santa Clara, CA (US); Xiaogang Zhu, Fremont, CA (US); Yan Fan, Los Altos Hills, CA (US)

(73) Assignee: Marvell International Ltd., Hamilton (BM)

( * ) Notice: Subject to any disclaimer, the term of this patent is extended or adjusted under 35 U.S.C. 154(b) by 1030 days.

(21) Appl. No.: 13/676,440

(22) Filed: Nov. 14, 2012

Related U.S. Application Data

(60) Provisional application No. 61/559,594, filed on Nov. 14, 2011.

(51) Int. Cl.
*G06F 13/14* (2006.01)
*G06F 13/16* (2006.01)
*G06F 12/06* (2006.01)

(52) U.S. Cl.
CPC ..................................... *G06F 12/06* (2013.01)

(58) Field of Classification Search
CPC ......... G06F 13/14; G06F 13/36; G06F 13/16
See application file for complete search history.

(56) References Cited

U.S. PATENT DOCUMENTS

| | | | |
|---|---|---|---|
| 6,571,308 B1* | 5/2003 | Reiss et al. | 710/315 |
| 7,165,184 B2* | 1/2007 | Fuks | 713/400 |
| 7,334,073 B2* | 2/2008 | Choi et al. | 710/315 |
| 7,613,850 B1* | 11/2009 | Doering | G06F 13/1621 710/36 |
| 7,814,258 B2* | 10/2010 | Das et al. | 710/305 |
| 7,836,088 B2* | 11/2010 | Chavda | G06Q 10/107 707/795 |
| 7,945,719 B2* | 5/2011 | Hunsaker et al. | 710/112 |
| 8,041,867 B2* | 10/2011 | Lin | 710/110 |
| 8,631,184 B2* | 1/2014 | Mangano et al. | 710/310 |
| 8,831,021 B2* | 9/2014 | Deivasigamani et al. | 370/402 |
| 8,874,976 B2* | 10/2014 | Lakshmanamurthy et al. | 714/48 |
| 2004/0024943 A1* | 2/2004 | Lupien et al. | 710/305 |
| 2004/0107306 A1* | 6/2004 | Barth | G06F 13/4031 710/310 |
| 2005/0289306 A1* | 12/2005 | Muthrasanallur et al. | 711/158 |
| 2006/0190655 A1* | 8/2006 | Kautzman et al. | 710/306 |
| 2007/0073954 A1* | 3/2007 | Wang | 710/309 |
| 2009/0100206 A1* | 4/2009 | Wang | 710/112 |
| 2010/0211714 A1* | 8/2010 | LePage | 710/310 |
| 2011/0320653 A1* | 12/2011 | Lais et al. | 710/65 |
| 2012/0311213 A1* | 12/2012 | Bender et al. | 710/113 |

\* cited by examiner

*Primary Examiner* — Henry Tsai
*Assistant Examiner* — Christopher A Daley

(57) ABSTRACT

A system on a chip includes a network, an interface and a bridge module. The network includes one or more devices. The network is configured to operate in a first domain. Communication in the first domain is based on a first set of read and write ordering rules. An interface is connected between the network and a second chip. Communication between the interface and the second chip is in a second domain. Communication in the second domain is based on a second set of read and write ordering rules. The second set of read and write ordering rules are different than the first set of read and write ordering rules. The bridge module is configured to map communication transactions between the first domain and the second domain.

29 Claims, 7 Drawing Sheets

US 9,489,304 B1

BI-DOMAIN BRIDGE ENHANCED SYSTEMS AND COMMUNICATION METHODS

CROSS-REFERENCE TO RELATED APPLICATIONS

This application claims the benefit of U.S. Provisional Application No. 61/559,594, filed on Nov. 14, 2011. The disclosure of the above application is incorporated herein by reference in its entirety.

FIELD

The present disclosure relates to intra-chip communication protocols and inter-chip communication protocols.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A first system on a chip (SOC) can communicate with a second SOC using inter-chip communication protocols. As an example, in a peripheral component interconnect express (PCIe) domain PCIe protocols can be used for communication between SOCs. The SOCs can include respective PCIe interfaces. The PCIe interfaces communicate with each other on a single channel based on the PCIe protocols and according to PCIe ordering rules. The channel is used for transmitting read and write requests between the PCIe interfaces. The PCIe interfaces share the channel, such that (i) read and write requests of the first SOC and corresponding read completion data, and (ii) read and write requests of the second SOC and corresponding read completion data, are transmitted over the same channel. Read completion data refers to data read from a first SOC (or responder) to satisfy a read request received from a second SOC (or requestor).

The read and write requests transmitted between the PCIe interfaces are implemented according to the PCIe ordering rules. The PCIe ordering rules allow the PCIe interfaces to determine the order in which to execute multiple read requests, multiple write requests and/or a combination of a read request and a write request. For example, if a PCIe interface receives a read request and a write request, the PCIe ordering rules allow the interface to determine which one of the read request and the write request to perform prior to performing the other one of the read request and the write request.

Modules, devices, buses and/or other elements within a SOC may communicate with each other using intra-chip (or on-chip) communication protocols. As an example, advanced microcontroller bus architecture (AMBA) protocols, such as advanced extensible interface (AXI) protocols can be used in an AXI domain to communicate between elements within a SOC. An SOC may have any number of elements. Communication between each pair of the elements can be performed using, for example, three channels. The first and second channels are used for sending respectively read requests and write requests between the elements. The third channel can be used for sending response signals to the read and write requests.

Although AXI protocols include AXI ordering rules, the AXI ordering rules are more relaxed than the PCIe ordering rules. The AXI ordering rules allow the elements of a SOC to determine the order in which to execute multiple read requests and multiple write requests. The AXI ordering rules do not allow a SOC to determine in which order to perform a combination of a read request and a write request. The third channel is used in the AXI domain to indicate when a previous request is satisfied. This allows an element to determine when to send the next request and prevents, for example, a read request from overtaking a write request.

For example, a first element in a SOC can issue a write request to write data to a second element in the SOC. The first element then issues a read request to read the data back from the second element. The write request and the read request can be transmitted on different channels in the AXI domain and can have associated transmission and execution delays, which can vary. Since the delays can vary and since the AXI protocols do not include ordering rules for a combination of received write and read requests, the read request may overtake the write request (referred to as a race condition). A read request overtakes a write request when the write request was issued before the read request and the read request is received and/or processed prior to receiving and/or processing the write request. If a read request overtakes a write request, previously written data can be read back instead of reading back the data being written as a result of the write request.

A race condition can occur unless precautionary tasks are performed. As an example, a first element of an SOC can wait for a write response from the second element before sending a read request to the second element. The write response indicates to the first element that the write request has been received and is being processed. This assures that the read request does not overtake the write request.

SUMMARY

A system on a chip is provided and includes a network, an interface and a bridge module. The network includes one or more devices. The network is configured to operate in a first domain. Communication in the first domain is based on a first set of read and write ordering rules. An interface is connected between the network and a second chip. Communication between the interface and the second chip is in a second domain. Communication in the second domain is based on a second set of read and write ordering rules. The second set of read and write ordering rules are different than the first set of read and write ordering rules. The bridge module is configured to map communication transactions between the first domain and the second domain.

In other features, a method is provided and includes operating a network within a first chip in a first domain. The network includes one or more devices. Communication in the first domain is based on a first set of read and write ordering rules. The method further includes communicating in a second domain and with a second chip via an interface. The interface is connected between the network and the second chip. Communication in the second domain is based on a second set of read and write ordering rules. The second set of read and write ordering rules are different than the first set of read and write ordering rules. Communication transactions between the first domain and the second domain are mapped via the first chip.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

SOCs can include respective PCIe interfaces. The PCIe interfaces can be used to interconnect the SOCs in an embedded environment. Embedded SOCs can each use AMBA protocols, such as AXI protocols, to communicate between elements within the respective SOCs. PCIe and AMBA protocols have different sets of read and write ordering rules. Thus, issues can arise between a PCIe domain and an AMBA domain.

The following implementations include read and write transaction mapping between multiple domains (e.g., PCIe and AXI domains) within SOCs. The read and write transaction mapping refers to mapping signals initially transmitted in a first domain to signals transmitted in a second domain. The term "signal" as used herein may refer to a transaction, transmitted to conduct a transaction, and/or be equivalent to a transaction. The implementations preserve the ordering rules associated with each of the domains while providing a set of bi-domain bridge ordering rules and techniques for bridging between the domains.

Figure 1:
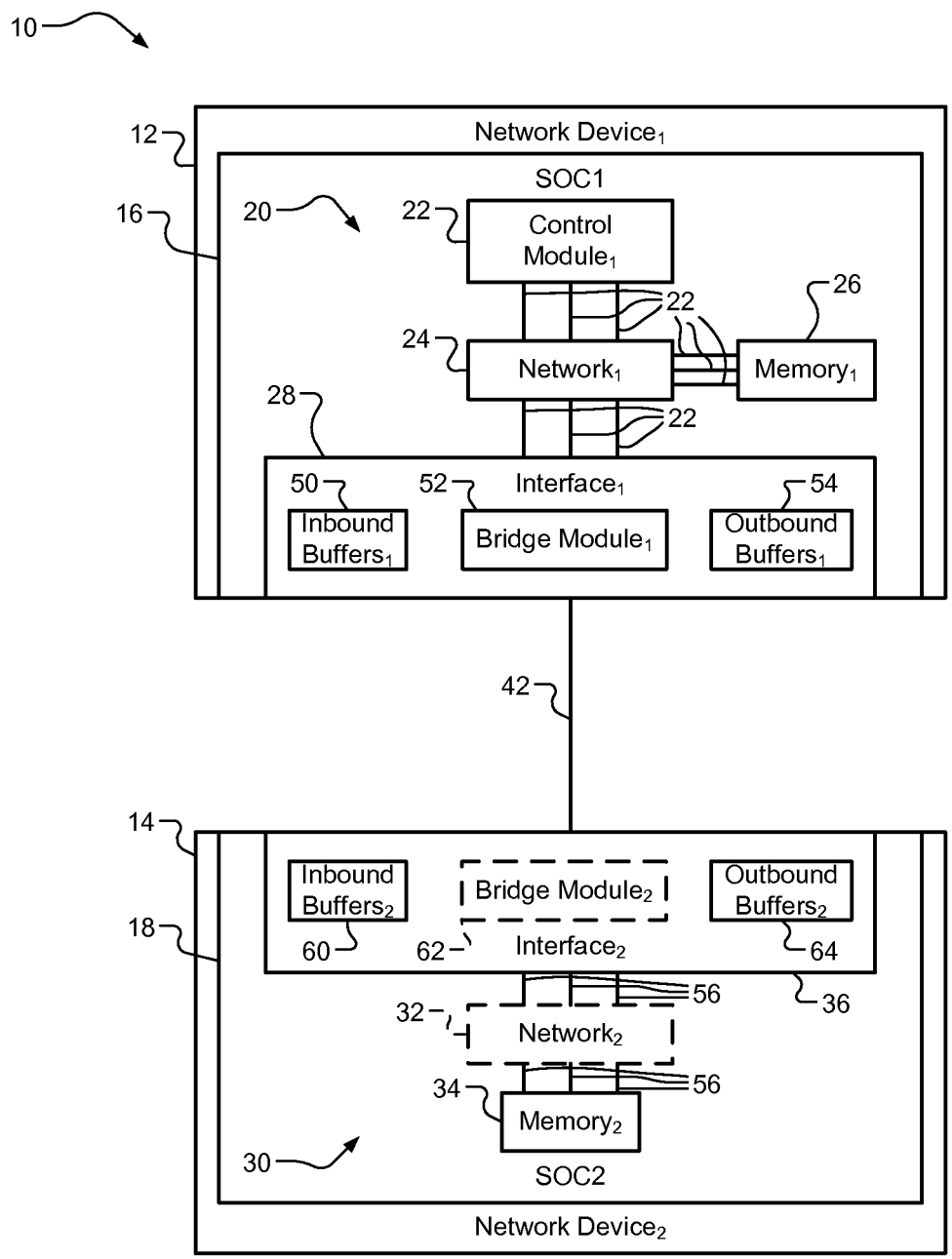
FIG. 1 is a functional block diagram of a multi-domain network incorporating one or more bi-domain bridge enhanced chips and illustrating inter-chip and intra-chip communication in accordance with the present disclosure.
Figure 4:
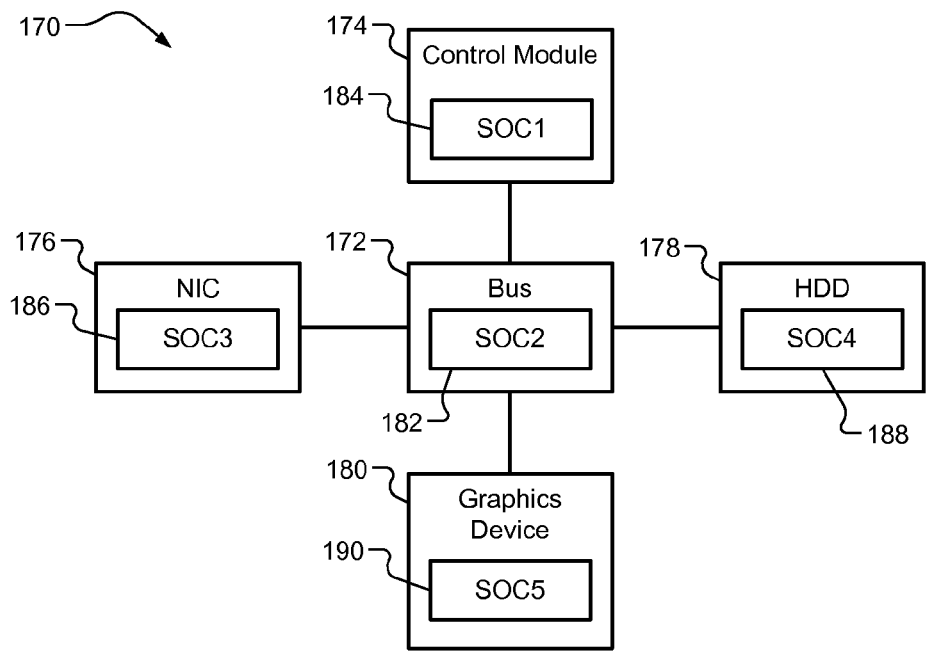
FIG. 4 is a functional block diagram of another network incorporating a bus architecture in accordance with the present disclosure.
Figure 5:
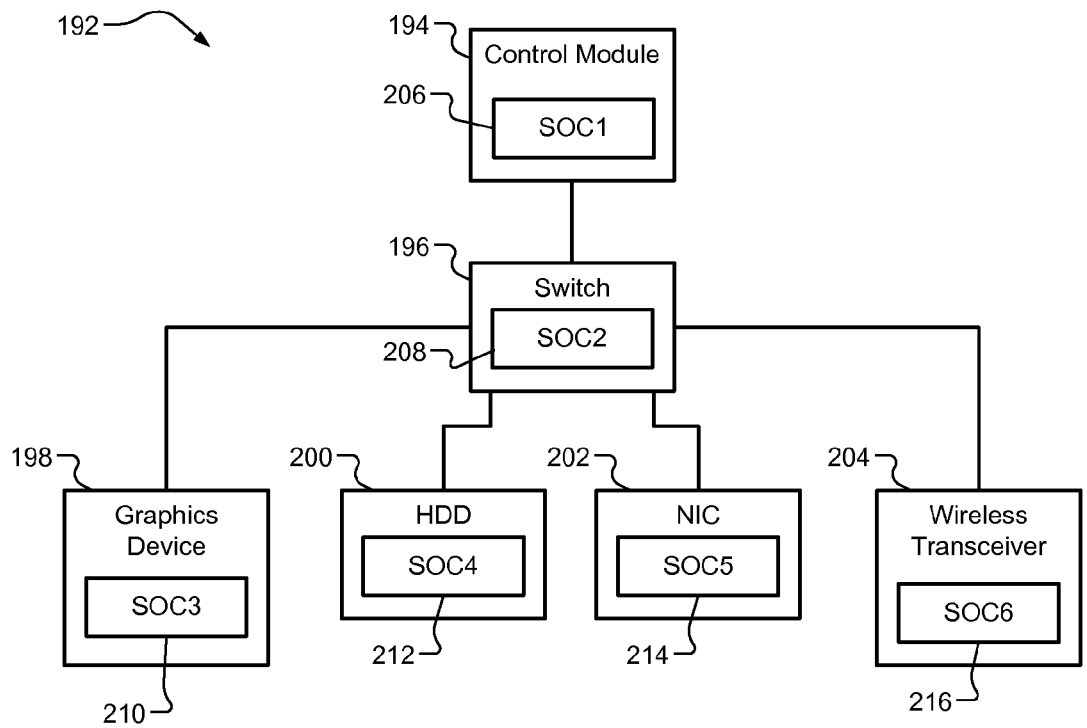
FIG. 5 is a functional block diagram of another network incorporating a switch architecture in accordance with the present disclosure.

In FIG. 1, a multi-domain network 10 is shown. The multi-domain network 10 includes a first network device 12 and a second network device 14. The network devices 12, 14 may be, for example, a control module, a switch, a computer, a bus, a graphics device, a hard disk drive, a solid-state memory drive, a network interface card (NIC), and a wireless transceiver. Examples of network devices are shown in FIGS. 4 and 5. The first network device 12 includes a first SOC 16. The second network device 14 includes a second SOC 18, which is in communication with the first SOC 16. The SOCs 16, 18 may be bi-domain bridge enhanced devices. A bi-domain bridge enhanced device refers to a device that includes a bridge module for mapping transactions between two domains (e.g., between AXI and PCIe domains).

The first SOC 16 includes a first communication system 20. The first communication system 20 includes a control module 22, a first network 24, a first memory 26, and a first interface 28. The second SOC 18 includes a second communication system 30. The second communication system 30 may include a second network 32, a second memory 34, and a second interface 36. In one implementation, the second SOC 18 is a solid-state memory device, is not bi-domain enhanced, and does not include a bridge module and/or the second network 32.

The control module 22 and/or the first interface 28 may control access to the first memory 26 and communicates with the first network 24, the first memory 26 and/or the first interface 28 via three channels 40. The first channel is a write channel, the second channel is a read channel, and the third channel is a response channel. Write request signals transmitted between (i) the control module 22, and (ii) the first network 24, the first memory 26, and the first interface 28 are transmitted over the write channel. Read request signals and read completion data signals transmitted between (i) the control module 22, and (ii) the first network 24, the first memory 26, and the first interface 28 are transmitted over the read channel. A read completion signal includes read completion data, which refers to data read from a memory in response to a read request signal. Response signals transmitted in response to the read request signals, the write request signals, and/or the read completion data signals (referred to hereinafter as read and write signals) are transmitted over the response channel.

Although the first memory 26 is shown as being connected directly to the first network 24, the first memory 26 may be connected directly to the control module 22. The first memory 26 and other memories disclosed herein may, for example, include first-in-first-out (FIFO) memory, direct memory access (DMA) memory, double data rate (DDA) memory, static random access memory (SRAM), or other suitable memory.

The first network 24 may include, for example, one or more buses and provides connections between devices of the first SOC 16. The first network 24 facilitates inter-chip communication within the first SOC 16. The first interface 28 is connected to the first network 24 and is in communication with the second SOC 18 via a transmission medium 42, which may have a single shared channel for read and write signals. The transmission medium 42 may be, for example, a wired medium, a wireless medium, or other transmission medium suitable for transmitting communication signals between the SOCs 16, 18.

The first interface 28 may be a PCI and/or PCIe interface and include inbound buffers 50, a first bridge module 52, and outbound buffers 54. The inbound buffers 50 store read and write signals received from the second SOC 18. The first bridge module 52 maps transactions between (i) a first domain of the control module 22, the first network 24, and the first memory 26, and (ii) a second domain of the first interface 28 and transmission medium 42. The first domain may be, for example, an AMBA and/or AXI domain. The second domain may be, for example, a PCI and/or PCIe domain. The first interface 28 may be referred to as a root complex and facilitates (i) inter-chip communication between the control module 22 and the first interface 28, and (ii) intra-chip communication between the SOCs 16, 18. The first bridge module 52 may be used to control access to the first memory 26. The outbound buffers 54 store request signals transmitted from the control module 22 and/or first SOC 16 to the second interface 36 and/or second SOC 18. The first interface 28 may communicate with the second interface 36 via the channel of the transmission medium 42.

The second network 32 may include, for example, one or more buses and provides connections between devices of the second SOC 18. The second network 32 facilitates inter-chip communication within the second SOC 18. The second network 32 communicates with the second memory 34 and the second interface 36 using three channels 56 (e.g., write, read and response channels as described above). The second interface 36 is connected to the second network 34 and is in communication with the first SOC 16 and/or first interface 28 via the transmission medium 42.

The second interface 36 may be a PCI and/or PCIe interface and include inbound buffers 60, a second bridge module 62, and outbound buffers 64. The inbound buffers 60 may store write request signals and read request signals received from the control module 22, first interface 28 and/or first SOC 16. The inbound buffers 60 store write requests, read requests, and/or read completion data received from the first SOC 16. The second bridge module 62 maps transactions between (i) a third domain of the second network 32 and the second memory 34 and (ii) a fourth domain of the second interface 36 and the transmission medium 42. The third domain may be the same as the first domain. The fourth domain may be the same as the second domain. The second interface 36 may be referred to as an end point device and facilitates intra-chip communication between the SOCs 16, 18. The outbound buffers 64 store requests and/or read completion data transmitted from second SOC 18 and/or the second memory 34 to first SOC 16, the control module 22, and/or first interface 28. The first SOC 16, the control module 22, the first interface 28, the bridge modules 52, 62, and/or the second interface 36 may control access to the second memory 34.

One of the first SOC 16 and the second SOC 18 may operate as a master device (or requestor) and the other one of the first SOC 16 and the second SOC 18 may operate as a slave device (or responder). For example, when the first SOC 16 is transmitting request signals to the second SOC 18, the first SOC 16 is the master device and the second SOC 18 is the slave device.

The first and third domains may follow a first set of read and write ordering rules. The second and fourth domains may follow a second set of read and write ordering rules. The ordering rules indicate the order in which read and write signals are passed (i) between the control module 22 and the first interface 28, and (ii) between the second memory 34 and the second interface 36. The read and write signals may include posted request signals and non-posted request signals. The posted request signals refer to signals in response to which response signals are transmitted. For example, a posted write request signal may be transmitted from the control module 22 to the first interface 28. The first interface 28 responds to the posted write request signal by transmitting a response signal back to the control module 22 indicating that the posted write request signal has been received and accepted.

A non-posted request (NPR) signal refers to a request signal for which response signals are not transmitted. Non-posted write request signals may include, for example, an input and output (I/O) signals and/or configuration signals. The I/O signals and the configuration signals have associated data. The I/O signals may be associated with, for example, PCI communication. The configuration signals may be transmitted to configure a SOC and/or a control module of the SOC.

The bridge modules 52, 62 implement the read and write ordering rules and additional techniques for mapping transactions (i) between the first and second domains, and/or (ii) between the third and fourth domains. An example set of read and write ordering rules is provided by Tables 1 and 2 below. The communication in the first, second, third and fourth domains of the SOCs 16, 18, the read and write ordering rules, and the additional techniques are further described below with respect to FIGS. 6-8.

Although the following implementations are primarily described with respect to bridging between AXI and PCIe domains, the read and write ordering rules may be modified to apply to other domains. Also, although the following implementations are primarily described with respect to the bridging between domains being implemented within PCIe interfaces, the bridging between domains may be implemented elsewhere, within the SOCs, and/or external to the PCIe interfaces. For example, the first bridging module 52 may be implemented external to the first interface 28 and between the control module 22 and the first interface 28. As another example, the first bridging module 52 may be implemented in the control module 22 and the control module 22 may be directly connected to and/or include the first interface 28.

Figure 2:
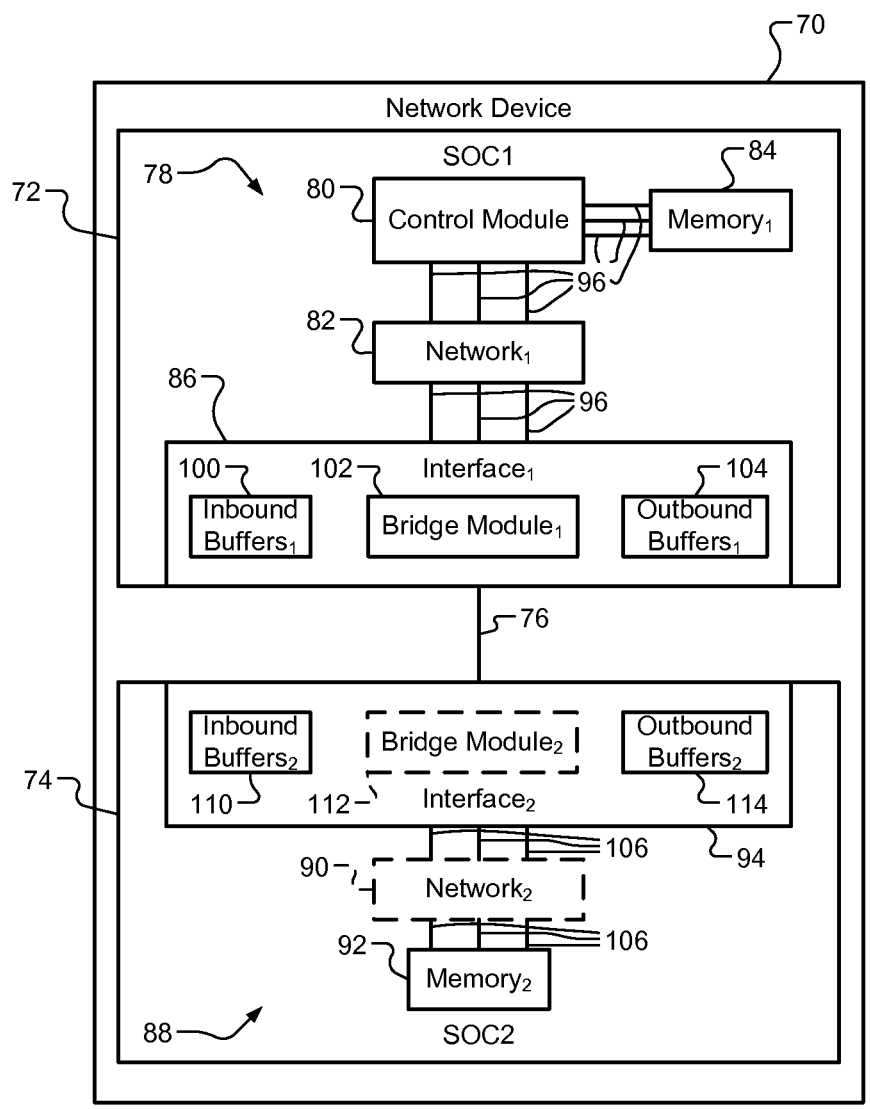
FIG. 2 is a functional block diagram of a network device incorporating one or more bi-domain bridge enhanced chips and illustrating inter-chip and intra-chip communication in accordance with the present disclosure.

In FIG. 2, a network device 70 is shown. The network device 70 includes a first SOC 72 and a second SOC 74. The first SOC 72 is in communication with the second SOC 74 via a transmission medium 76 (e.g., a circuit board trace or electrically conductive transmission line). The SOCs 72, 74 may be bi-domain bridge enhanced devices.

The first SOC 72 includes a first communication system 78. The first communication system 78 includes a control module 80, a first network 82, a first memory 84, and a first interface 86. The second SOC 74 includes a second communication system 88. The second communication system 88 may include a second network 90, a second memory 92, and a second interface 94. In one implementation, the second SOC 74 is a solid-state memory device, is not bi-domain enhanced, and does not include a bridge module and/or the second network 90.

The control module 80 and/or the first interface 86 controls access to the first memory 84. The control module 80 communicates with the first network 82, the first memory 84, and the first interface 86 using three channels 96 (e.g., write, read and response channels as described above). Although the first memory 84 is shown as being connected directly to the control module 80, the first memory 84 may be connected directly to the first network 82. The first network 82 may include, for example, one or more buses and provides connections between devices of the first SOC 72. The first network 82 facilitates inter-chip communication within the first SOC 72.

The first interface 86 may be a PCI and/or PCIe interface and include inbound buffers 100, a first bridge module 102, and outbound buffers 104. The inbound buffers 100 may store write requests, read requests, and/or read completion data received from the second interface 94 and/or second SOC 74. The first bridge module 102 maps transactions between (i) a first domain of the control module 80, the first network 82, and the first memory 84, and (ii) a second domain of the transmission medium 76 and the first interface 86. The first domain may be, for example, an AMBA and/or AXI domain. The second domain may be, for example, a PCI and/or PCIe domain.

The first interface 86 may be referred to as a root complex and facilitates (i) inter-chip communication between the control module 80 and the first interface 86, and (ii) intra-chip communication between the SOCs 72, 74. The first bridge module 102 may be used to control access to the first memory 84. The outbound buffers 104 store request signals transmitted from the control module 80 and/or first SOC 72 to the second interface 94 and/or second SOC 74. The first interface 86 may communicate with the second interface 94 via a single shared channel.

The second network 90 may include, for example, one or more buses and provides connections between devices of the second SOC 74. The second network 90 communicates with the second memory 92 and the second interface 94 using three channels 106 (e.g., write, read and response channels as described above). The second network 90 facilitates inter-chip communication within the second SOC 74. The second interface 94 is connected to the second network 90 and is in communication with the first SOC 72 and/or first interface 86 via the transmission medium 76.

The second interface 94 may be a PCI and/or PCIe interface and include inbound buffers 110, a second bridge module 112, and outbound buffers 114. The inbound buffers 110 may store write requests, read requests, and/or read completion data received from the control module 80, first interface 86 and/or first SOC 72. The second bridge module 112 maps transactions between (i) a third domain of the second network 90 and the second memory 92, and (ii) a fourth domain of the transmission medium 76 and the second interface 94. The third domain may be the same as the first domain. The fourth domain may be the same as the second domain.

The second interface 94 may be referred to as an end point device and facilitates intra-chip communication between the SOCs 72, 74. The outbound buffers 114 store request signals and/or read completion data transmitted from the second SOC 74 to the control module 80, first interface 86 and/or first SOC 72. The first SOC 72, the control module 80, the first interface 86, the second bridge module 112 and/or the second interface 94 may control access to the second memory 92.

Figure 3:
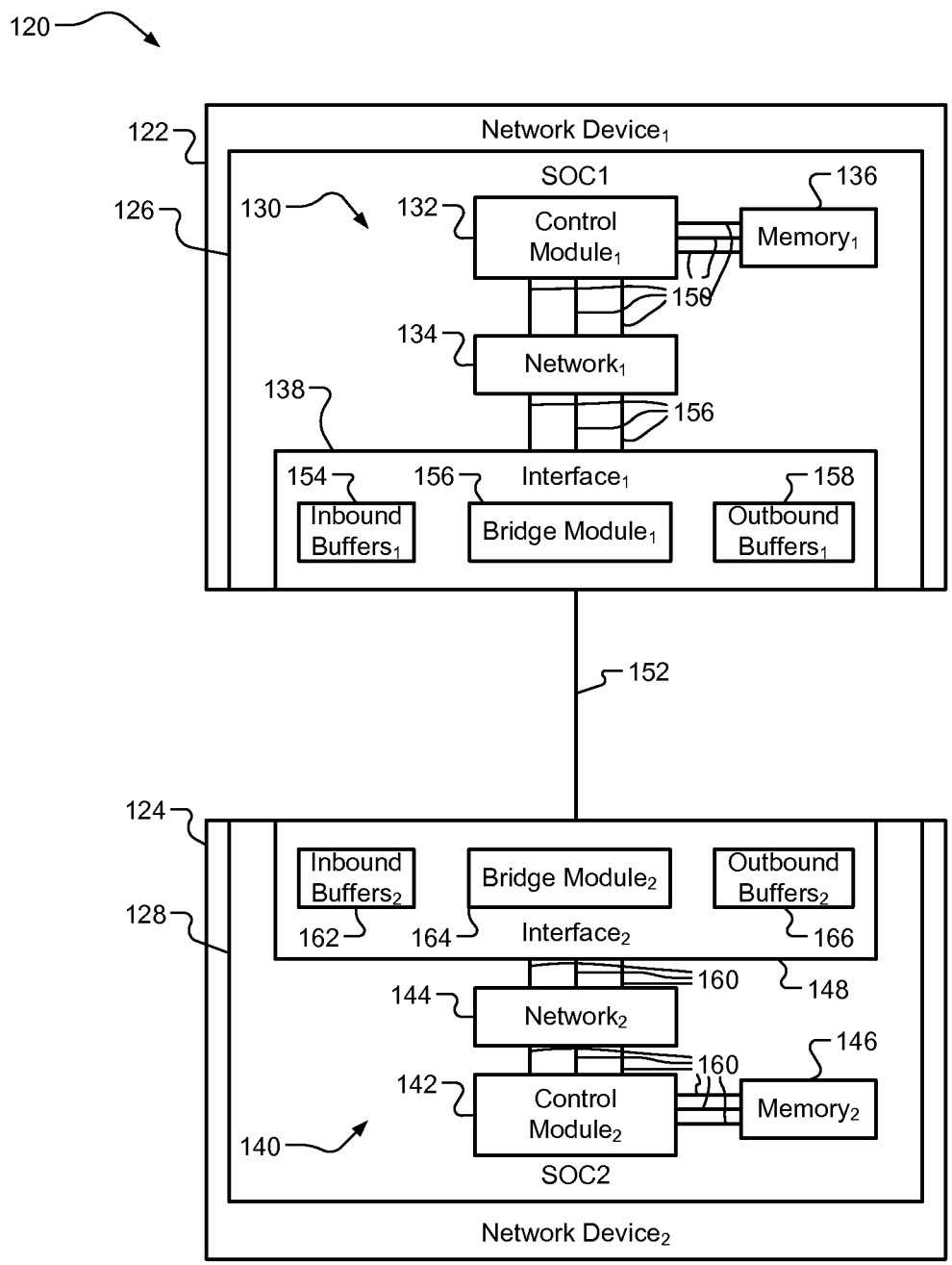
FIG. 3 is a functional block diagram of another multi-domain network incorporating two bi-domain bridge enhanced chips and illustrating inter-chip and intra-chip communication in accordance with the present disclosure.

In FIG. 3, a multi-domain network 120 is shown. The multi-domain network includes a first network device 122 and a second network device 124. The first network device 122 includes a first SOC 126. The second network device 124 includes a second SOC 128, which is in communication with the first SOC 126. The SOCs 126, 128 may be bi-domain bridge enhanced devices.

The first SOC 126 includes a first communication system 130. The first communication system 130 includes a first control module 132, a first network 134, a first memory 136, and a first interface 138. The second SOC 128 includes a second communication system 140. The second communication system 140 includes a second control module 142, a second network 144, a second memory 146, and a second interface 148.

The first control module 132 controls access to the first memory 136. The first control module 132 communicates with the first network 134, the first memory 136, and the first interface 138 using three channels 150 (e.g., write, read and response channels as described above). Although the first memory 136 is shown as being connected directly to the first control module 132, the first memory 136 may be connected directly to the first network 134. The first network 134 may include, for example, one or more buses and provides connections between devices of the first SOC 126. The first network 134 facilitates inter-chip communication within the first SOC 126. The first interface 138 is connected to the first network 134 and is in communication with the second SOC 128 via a transmission medium 152. The transmission medium 152 may be, for example, a wired medium, a wireless medium, or other transmission medium suitable for transmitting communication signals between the SOCs 126, 128.

The first interface 138 may be a PCI and/or PCIe interface and include inbound buffers 154, a bridge module 156, and outbound buffers 158. The inbound buffers 154 may store write requests, read requests, and/or read completion data received from the second control module 142, second interface 148 and/or second SOC 128. The first bridge module 156 maps transactions between (i) a first domain of the first control module 132, the first network 134, and the first memory 136, and (ii) a second domain of the first interface 138 and transmission medium 152. The first domain may be, for example, an AMBA and/or AXI domain. The second domain may be, for example, a PCI and/or PCIe domain. The first interface 138 may be referred to as a root complex and facilitates (i) inter-chip communication between the first control module 132 and the first interface 138, and (ii) intra-chip communication between the SOCs 126, 128. The outbound buffers 158 store request signals and/or read completion data transmitted from the first control module 132 and/or first SOC 126 to the second control module 142, second interface 148 and/or second SOC 128. The first interface 138 may communicate with the second interface 148 via a single shared channel.

The second control module 142 may control access to the second memory 146. The second control module 142 communicates with the second network 144, the second memory 146, and the second interface 148 using three channels 160 (e.g., write, read and response channels as described above). Although the second memory 146 is shown as being connected directly to the second control module 142, the second memory 146 may be connected directly to the second network 144. The second network 144 may include, for example, one or more buses and provides connections between devices of the second SOC 128. The second network 144 facilitates inter-chip communication within the second SOC 128. The second interface 148 is connected to the second network 144 and is in communication with the first SOC 126 and/or first interface 138 via the transmission medium 152.

The second interface 148 may be a PCI and/or PCIe interface and include inbound buffers 162, a second bridge module 164, and outbound buffers 166. The inbound buffers 162 may store write requests, read requests, and/or read completion data received from the first control module 132, first interface 138 and/or first SOC 126. The second bridge module 164 maps transactions between (i) a third domain of the second control module 142, the second memory 146 and the second network 144, and (ii) a fourth domain of the second interface 148 and the transmission medium 152. The third domain may be the same as the first domain. The fourth domain may be the same as the second domain. The second interface 148 may be referred to as an end point device and facilitates (i) inter-chip communication between the second control module 142 and the second interface 148, and (ii) intra-chip communication between the SOCs 126, 128. The outbound buffers 166 store requests transmitted from the second control module 142 and/or second SOC 128 to the first control module 132, first interface 138 and/or first SOC 126. The outbound buffers 166 may store write requests, read requests, and/or read completion data received from the second control module 142.

In FIG. 4, a network 170 incorporating a bus architecture is shown. The network 170 includes multiple network devices, such as a bus 172, a control module 174, a NIC 176, a HDD 178, and a graphics device 180. The control module 174, the NIC 176, the HDD 178, and the graphics device 180 communicate with each other via the bus 172. The bus 172 may be replaced with a switch and/or be connected to PCI devices. The bus 172, the control module 174, the NIC 176, the HDD 178 and the graphics device 180 may include respective SOCs 182, 184, 186, 188, 190. The SOCs 182, 184, 186, 188, 190 may be bi-domain bridge enhanced devices. Each of the SOCs 182, 184, 186, 188, 190 may be replaced with one of the SOCs of FIGS. 1-3.

In FIG. 5, a network 192 incorporating a switch architecture is shown. The network 192 includes multiple network devices, such as a control module 194, a switch 196, a graphics device 198, a HDD 200, a NIC 202, and a wireless transceiver 204 (e.g., a Wi-Fi™ transceiver). The control module 194 communicates with the graphics device 198, the HDD 200, the NIC 202, and the wireless transceiver 204 via the switch 196. The control module 194, the graphics device 198, the HDD 200, the NIC 202, and the wireless transceiver 204 may include respective SOCs 206, 208, 210, 212, 214, 216. The SOCs 206, 208, 210, 212, 214, 216 may be bi-domain bridge enhanced devices. Each of the SOCs 206, 208, 210, 212, 214, 216 may be replaced with one of the SOCs of FIGS. 1-3.

Figure 6:
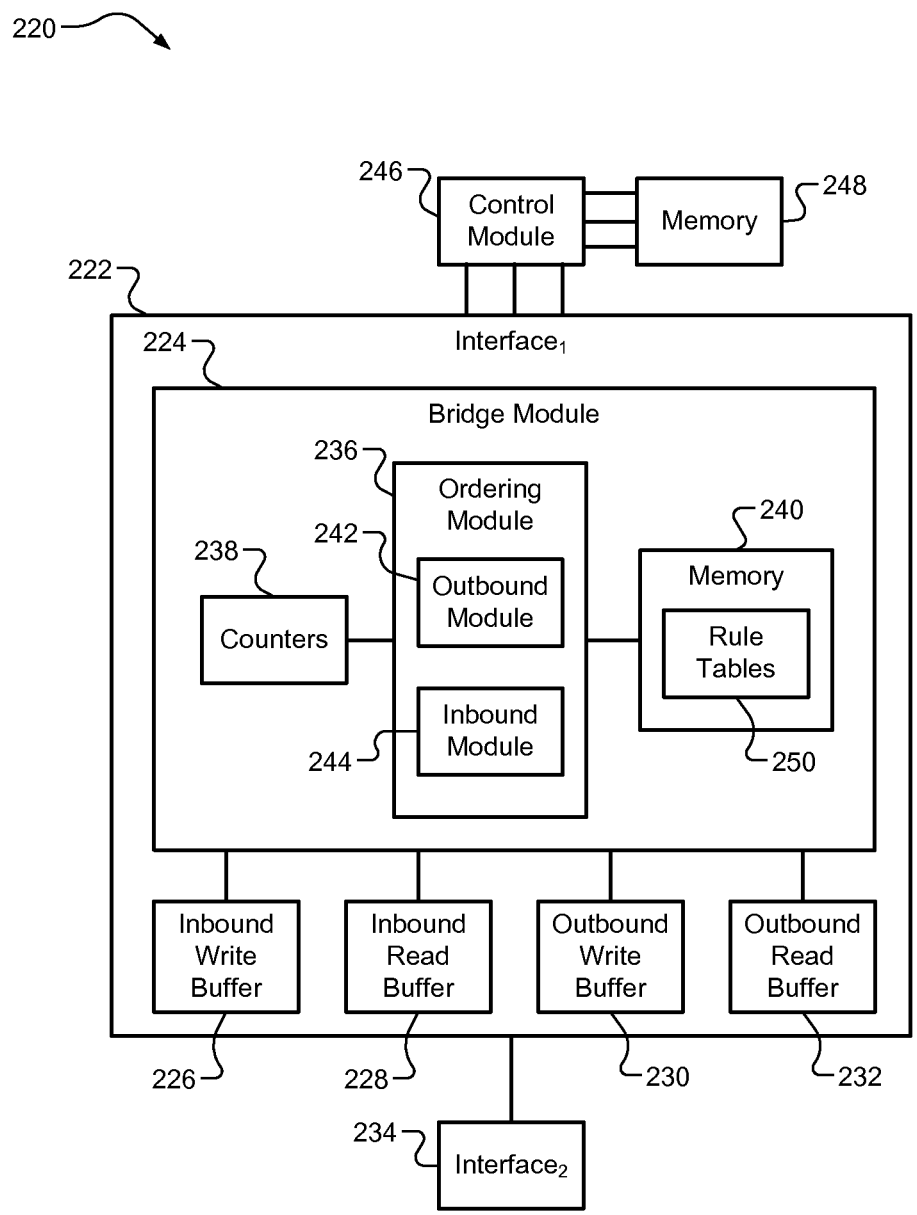
FIG. 6 is a functional block diagram of a bi-domain communication system in accordance with the present disclosure.

In FIG. 6, a bi-domain communication system 220 is shown. The bi-domain communication system 220 includes a bi-domain interface 222 that is a bi-domain bridge enhanced device. The bi-domain interface 222 may be used as one or more of the interfaces of FIGS. 1-3. The bi-domain interface 222 includes one or more inbound buffers, one or more outbound buffers, and a bridge module 224. The inbound buffers may include an inbound write buffer 226 and an inbound read buffer 228. The outbound buffers may include an outbound write buffer 230 and an outbound read buffer 232. The inbound buffers may be used to store write requests, read requests, and read completion data received from a second interface 234. The second interface 234 may be incorporated in a different SOC than the bi-domain interface 222. The outbound buffers may be used to store write requests, read requests, and/or read completion data transmitted from the bi-domain interface 222 to the second interface 234. The bi-domain interface 222 and the second interface 234 may communicate with each other in a first domain (e.g., PCIe domain).

The bridge module 224 includes an ordering module 236, one or more counters 238, and memory 240. The ordering module 236 may include an outbound module 242 and an inbound module 244. The outbound module 236 may be used to determine and control ordering of outbound signals including request signals and/or read completion data signals. The inbound module 244 may be used to determine and control ordering of inbound signals including request signals and/or read completion data signals.

The counters 238 are used to count numbers of write request signals received between read request signals. For example, the bi-domain interface 222 may receive in the following order three write request signals, a first read request signal, two write request signals, and a second read request signal. A first one of the counters 238 may be used to count the number of write request signals (for this example the count is 3) received prior to the first read request signal. A second one of the counters 238 may be used to count the number of write request signals (for this example the count is 2) received prior to the second read request signal. The inbound module 244 and/or the ordering module 236 may decrement the first counter each time one of the first three write request signals are passed from the inbound write buffer 226 to a control module 246 (e.g., one of the control modules 22, 80, 132 of FIGS. 1-3) and/or memory 248 (e.g., one of the memories 26, 84, 136 of FIGS. 1-3). The control module 246 and/or memory 248 may operate in a second domain (e.g., AXI domain). The inbound module 244 and/or the ordering module 236 may block the first read request signal and signals received subsequent to the first read request signal until the first counter is equal to zero.

The blocking of the first request signal and signals received subsequent to the first read request signal, prevents a read request signal from overtaking a write request signal in the second domain. A second request signal overtakes a first request signal when the second request signal is transmitted subsequent to the first request signal and is processed by a receiving element (e.g., the control module 246) prior to the first request signal. In the second domain, communication between the control module 246 and the bi-domain interface 222 is performed via three communication channels 249. The three communication channels 249 are allocated respectively for i) write request signals, ii) read request and read completion data signals, and iii) response signals. As the second domain includes communication over three communication channels and processing time of write request signals and read request signals varies, the control module 246 may receive and/or execute the read request signal prior to the write request signal if the stated blocking were not performed. This is further described with respect to the method of FIG. 7.

The outbound modules 230, 232, the ordering module 236, and/or the control module 246 controls ordering of outbound signals. As a first example, the control module 246 may wait for a response signal to be received for a first request signal prior to transmitting a second request signal to the bi-domain interface 222. The outbound modules 230, 232 and/or the ordering module 236 may send the response signal when the bi-domain interface 222 receives the first request signal, begins to accept the first request signal, buffers the first request signal, and/or transmits the first request signal to the second interface. This is further described with respect to the method of FIG. 8.

The control module 246 may initiate outbound requests while the bi-domain interface 222 receives, orders, and passes to the control module 246 inbound requests. The control module 246 and the ordering module 236 prevent race conditions. Race conditions refer to when (i) an outbound read request signal overtakes an outbound write request signal, or (ii) an inbound read request signal overtakes an inbound read request signal.

The ordering module 236 and/or the inbound modules 226, 228 may block a read request signal received from the second interface 234 when (i) a relaxed ordering (RO) bit of the read request signal is cleared, or (ii) a count of the number of write request signals received prior to the read request signal is equal to zero. The RO bit may be located in a header of the read request signal. The ordering module 236 and/or the inbound module 244 may permit the read request signal to pass from the bi-domain interface 222 to the control module 246 when the RO bit is set. This may occur independent of a count (i.e. regardless of the value of the count) of the number of write request signals received from the second interface 234. The RO bit may be set to permit a request signal to pass another request signal when (i) the request signals are both outbound signals or are both inbound signals, and (ii) ordering of the request signals is not important.

The memory 248 stores read and write ordering rule tables 250. The read and write ordering rule tables 250 may include, for example, Table 1 and Table 2 provided below. Table 1 provides rules for determine whether a certain type of request signal or read completion data signal can overtake another type of request signal or read completion data signal. Table 1 provides a row versus column setup and includes a bold-outlined block. The bold-outlined block includes answer boxes. Each of the answer boxes is designated by one of Rows A-D and one of Columns 2-5. When reading Table 1, each of the answer boxes provides a Yes or a No answer to a question of whether the signal in the first column and corresponding row can overtake the signal in the first row and corresponding column. For example, the answer box in Row A, Column 3 provides an answer Yes, indicating that a posted write request signal can overtake a non-posted request signal.

Each of the answer boxes provides a standard PCIe rule answer and a bi-domain bridging rule answer. The standard PCIe rule answer in not italicized. The bi-domain bridging rule answer is italicized. Certain answer boxes have a and b answers. One of the a and b answers are used based on whether a RO bit is set. If the RO bit is cleared, rule a is used. If the RO bit is set, rule b is used. A header of a request signal may include the RO bit to indicate whether to use rule a or b. The outbound module 242, the inbound module 244 and/or the ordering module 236 may determine which of the rules a and/or b can be used based on the RO bit. If an answer to a question is Optional, the row signal provided in the column 1 may overtake the column signal provided in columns 2-5 depending upon the implementation. Different answers may also be provided based on whether the signal in question is an outbound signal or an inbound signal, see for example Row B, Column 3.

In Table 1, Row A and Column 2 refer to posted write requests. Row B and Column 3 refer to non-posted requests and/or read requests. Row C and Column 4 refer to non-posted requests with data (e.g., input and output write requests or configuration requests). Row D and Column 5 refer to read completion data signals.

TABLE 1

Comparisons Between PCIe Ordering Rules and Bi-domain Bridge Ordering Rules

| Row Pass Column? | Column 2- Posted (or Write) Request | Column 3- Non-posted (or Read) Request | Column 4- Non-posted Request with Data (e.g., I/O or Configuration Write Request) | Column 5- Read Completion Data |
|---|---|---|---|---|
| Row A- Posted (or Write) Request | a) No/(No) b) Optional/(No) | Yes/(Yes) | Yes/(No)[1] | a) Optional/(Yes) b) Yes/( Yes) |
| Row B- Non-posted (or Read) Request | a) No/(No) b) Optional/(No) | Optional/ (Optional for Outbound, No for Inbound) | Optional/ (Optional for Outbound, No for Inbound) | Optional/(Yes) |
| Row C- Non-posted Request with Data (e.g., I/O or Configuration Write Request) | a) No/(No) b) Optional/(No) | Optional/ (Optional for Outbound, No for Inbound) | Optional/ (Optional for Outbound, No for Inbound) | Optional/(Yes) |
| Row D- Read Completion Data | a) No/(No) b) Optional/ (Optional for Outbound, No for Inbound) | Yes/(Yes) | Yes/(No)[2] | a) Optional/(No) b) No/(No) |

[1] The Yes answer is for deadlock prevention. A deadlock refers to when there is a cease in processing of signals due to inter-signal dependencies. The No answer is provided since an inbound non-posted request signal in a first domain (e.g., PCIe domain) that is converted to a write request signal for a second domain (e.g., AXI domain) is not prevented from making forward progress. This is because the target device (device or control module receiving the write request signal) is a slave device, which can receive and process write request signals without signal dependencies. In the outbound direction, the interface may allow posted requests to bypass non-posted requests with data.
[2] Inbound non-posted write request signals in a first domain (e.g., PCIe domain) are converted to write request signals for a second domain (e.g., AXI domain), which may share a data path (channel) with inbound posted write request signals. Read completion data signals are not able to bypass non-posted write request signals and/or the posted write request signals. The non-posted write request signals and/or the posted write request signals are permitted to make forward progress to a slave device that is able to receive and accept the non-posted write request signals and/or the posted write request signals without signal dependencies. The read completion data signals are blocked by the non-posted write request signals, but are able to progress forward, as the non-posted write request signals are progressed to completion.

Table 2 corresponds to Table 1. Each row in Table 2 corresponds with one of the answer boxes in Table 1. Each entry in column 1 of Table 2 refers to certain ones of the answers in one of the answer boxes of Table 1. For example, column 1, row 2 of Table 2 has the entry Ata, which refers to the answers provided in the answer box of Row A, Column 2 answers a. The second column of Table 2 provides the PCIe and bi-domain bridge answers as provided in Table 1. The third column of Table 2 provides the standard PCIe rule, which is applied for both outbound and inbound signals. The fourth column of Table 2 provides descriptions of the bi-domain bridge rules for outbound signals and inbound signals. Note that the descriptions can be different for outbound signals versus inbound signals. The bridge rules provided in the fourth column of Table 2 may be followed by any of the bridge modules and corresponding ordering modules, outbound modules, and/or inbound modules disclosed herein.

TABLE 2

| Table 1 Entry | PCIe/Bridge | PCIe Rule Description for Both Outbound and Inbound | Bridge Rule Descriptions |
|---|---|---|---|
| | | PCIe and Bi-domain Bridge Ordering Rule Descriptions | |
| A2a | No/(No) | A posted request must not pass another posted request unless A2b for PCIe applies. | Outbound: Master device issues writes with same AXI ID. Inbound: All writes are issued to system with same AXI ID. |
| A2b | Optional/(No) | A posted request with relaxed ordering (RO) bit set is permitted to pass another posted request. A posted request with identifier based ordering (IDO) bit set is permitted to pass another posted request if the two requester identifiers (IDs) of the posted requests are different. | Outbound: No re-ordering of posted requests. Inbound: No re-ordering of posted requests. |
| A3, A4 | A3: Yes/(Yes) A4: Yes/(No) | A posted request must be able to pass non-posted request to avoid deadlocks. | Outbound: Master device (Requestor) controls issue order of posted requests and non-posted requests, and write requests can pass non-posted read requests in AXI domain. Inbound: Write requests always issuable. A4 refers whether a posted write can pass a non-posted write. A posted write can pass in PCIe domain, but not in AXI domain, as AXI domain has independent read and write channels. There is no deadlock issue for inbound signals, since deadlock issues do not arise in the AXI domain and thus forward progress of requests is provided. |
| A5a | Optional/(Yes) | A posted request is permitted to pass a read completion data response, but is not required to be able to pass completion data unless A5b for PCIe applies. | Outbound: Outbound write requests can proceed without waiting for read completion data response to inbound requests. No relationship between outbound write and read completion data response to inbound requests. Inbound: Write requests can proceed without waiting for read completion data response to outbound requests. No relationship between inbound writes and read completion data responses to outbound requests. |
| A5b | Yes/(Yes) | For a PCIe to PCI/PCI-X Bridge with a PCI/PCI-X bus segment operating in a PCIe mode and for requests transmitted from the PCIe domain to the PCI domain, a posted request must be able to pass a read completion data response to avoid a deadlock. | Outbound: Write requests can proceed without waiting for a read completion data responses to inbound requests. No relationship between outbound write and read completion data responses to inbound requests. |

TABLE 2-continued

PCIe and Bi-domain Bridge Ordering Rule Descriptions

| Table 1 Entry | PCIe/Bridge | PCIe Rule Description for Both Outbound and Inbound | Bridge Rule Descriptions |
|---|---|---|---|
| | | | Inbound: Write requests can proceed without waiting for read completion data responses to outbound requests. No relationship between inbound writes and read completion data responses to outbound requests. |
| B2a | No/(No) | A read request must not pass a posted request unless B2b for PCIe applies. | Outbound: Master device (requestor) controls issuance of write requests. AXI write requests are non-bufferable (i.e. sent to PCIe when PCIe ready to transmit out of outbound buffer). Inbound: Bridge waits for determined number of write responses (write counter to decrease to zero), then issues a read request. |
| B2b | Optional/(No) | A read request, with IDO bit set, is permitted to pass a posted write request if the requester IDs of the read request and the posted write request are different. | Outbound: Master device (requestor) controls issuance of read and posted write requests. Inbound: Read request is not permitted to pass posted write request. Requestor ID based ordering is not used. |
| C2a | No/(No) | A non-posted write request with data must not pass a posted write request unless C2b for PCIe applies. | Outbound: Master device (requestor) controls issuance of non-posted write request with data. Inbound: Bridge decrements write count to zero and then issues read requests. Non-posted write request with data cannot pass posted write request, since both write requests share AXI write channel and a same AXI-ID of, for example, 0. |
| C2b | Optional/(No) | A non-posted write request with data and with RO bit set is permitted to pass posted requests. A non-posted write request with data and with an IDO bit set is permitted to pass a posted request if requester IDs of the requests are different. | Outbound and inbound: Same as C2a for bridge. |
| B3, B4, C3, C4 | Optional/(Optional for outbound, No for inbound) | A non-posted request is permitted to pass another non-posted request. | Outbound: Master device controls issuance of non-posted requests. Inbound: Non-posted request is not permitted to pass a non-posted request. Read vs. write and write vs. write relationship ordering is maintained. Read vs. read ordering relationship may be maintained. |

TABLE 2-continued

PCIe and Bi-domain Bridge Ordering Rule Descriptions

| Table 1 Entry | PCIe/Bridge | PCIe Rule Description for Both Outbound and Inbound | Bridge Rule Descriptions |
|---|---|---|---|
| B5, C5 | Optional/(Yes) | A non-posted request is permitted to pass a read completion data response. | Outbound and Inbound: A non-posted request is permitted to pass a read completion data response. No ordering relationship between request path and a read completion data response. |
| D2a | No/(No) | A read completion data response must not pass a posted write request unless D2b for PCIe applies. | Outbound: Master device controls issuance of read completion data responses and posted write requests. Wait for write request to be accepted by PCIe interface and then update memory state. The subsequently issued read completion data response can never overtake the posted write request. Inbound: Bridge does not issue read request until (non-bufferable) write request has been accepted by slave. |
| D2b | (Y/N)/(Y/N outbound, No inbound) | A read completion data response is permitted to pass a posted write request. A read completion data response with a RO bit set is permitted to pass a posted request. A read completion data response with an IDO bit set is permitted to pass a posted request if a completer ID of the read completion data response is different than the requester ID of the posted write request. | Outbound: Master device (requestor) controls transmission of outbound read completion data responses and posted write requests. Inbound: A read completion data response for an outbound request is not permitted to pass posted inbound write request. Bridge enforces order as in D2a. |
| D3, D4 | D3: Yes/(Yes) D4: Yes/(No) | A read completion data response must be able to pass non-posted requests to avoid deadlocks. | Outbound and inbound: No ordering relationships between read completion data responses and non-posted requests. |
| D5a | (Y/N)/(No) | Read completion data responses with different transaction IDs are permitted to pass each other. | Outbound: Read completion data responses are not permitted to pass each other. Bridge enforces strict order of read completion data responses. Inbound: Bridge issues Read completion data responses with same AXI-ID in order received to maintain order. |
| D5b | No/(No) | Read completion data responses with the same transaction ID must not pass each other. This ensures that multiple read completion data responses associated with a single memory read request remain in ascending address order. | Outbound and inbound: Read completion data responses are not permitted to pass each other. |

In the above Table 2, certain rules are referred to as "controlled by master device" or identified as "master device controls". This refers to an interface waiting for a response signal (e.g., AXI response signal) from a control module (or master device) prior to sending a next request signal. As an example, to prevent a read request signal from an interface from overtaking a write request signal, a control module receiving the read request signal and the write request signal may transmit a response signal after receiving and accepting the write request signal. The interface may then upon receiving the response signal transmit the read request signal. The write request signal may be marked as "non-bufferable" in cache attributes of the control module to indicate to the control module not to deliver the response signal until the write request signal has progressed to a point where a subsequent request signal cannot overtake the write request signal. This technique may also be used when the control module in a first domain (e.g., AXI domain) is accessing a second domain (e.g., PCIe domain). The control module may (i) control the ordering of read and write request signals, and/or (ii) issue read and write request signals over separate channels without waiting for response signals when ordering is not important.

Figure 7:
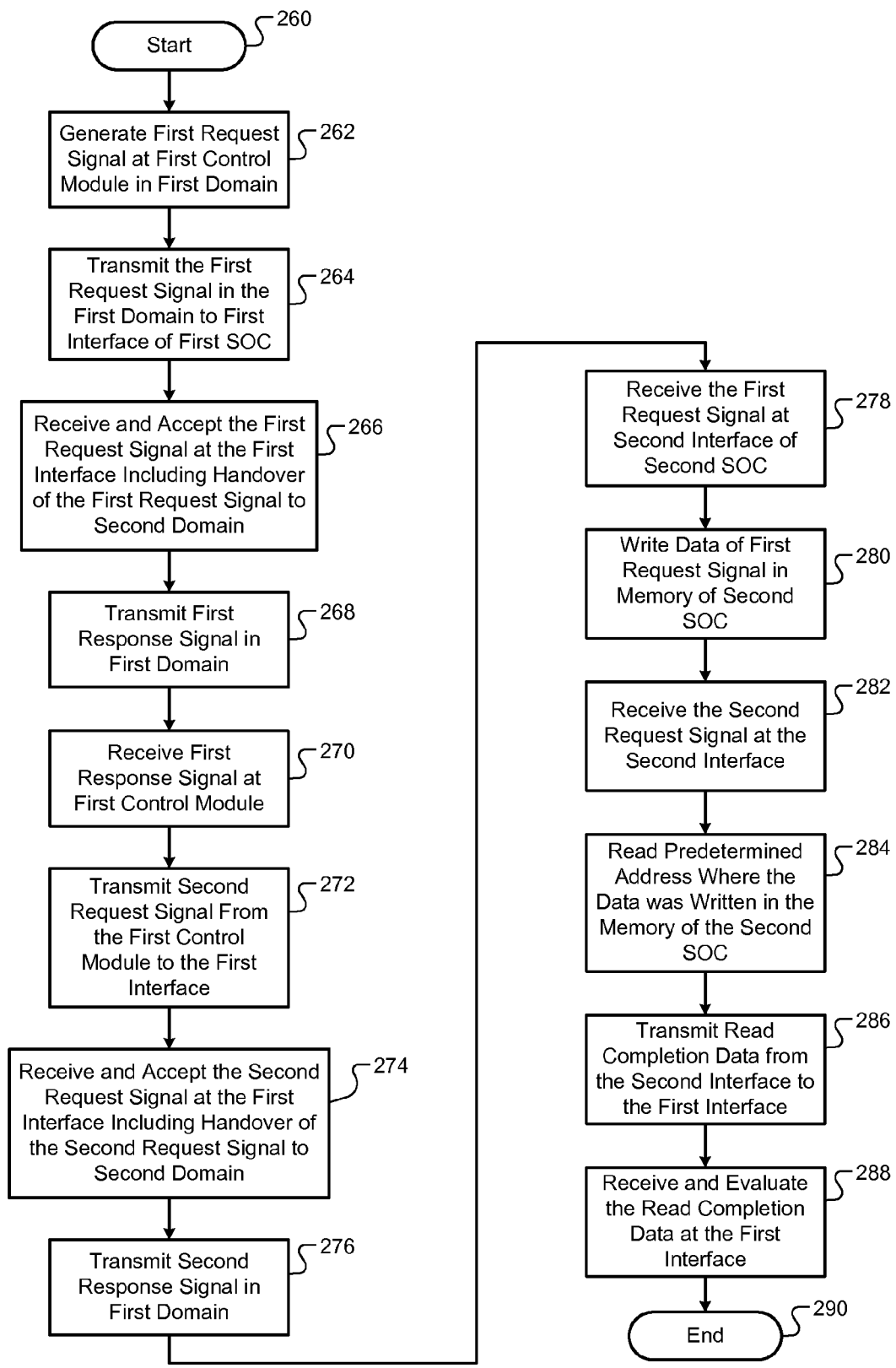
FIG. 7 illustrates an intra-chip bi-domain outbound communication method in accordance with the present disclosure.

The outbound rules in Table 1 that are referred to as "controlled by master" or identified as "master controls" may depend on and/or correspond to the intra-chip bi-domain outbound communication method, as described with respect to FIG. 7. These rules may include, for example, the outbound rules for entries A3, A4, B2a, B2b, C2a, B3, B4, C3, and/or C4. The inbound rules having entries B2a, C2a, and/or D2a may depend on and/or correspond to an intra-chip inbound bi-domain communication method of FIG. 8.

The above-described bridge modules of FIGS. 1-3 and 6 may return read response signals in an order that corresponding read request signals are received. The bridge modules may return write response signals in an order that corresponding write request signals are received. Inbound request signals received by a bridge module and from a remote SOC may be issued (passed to the local SOC of the bride module) with an identifier (e.g., AXI identifier) of zero. This allows responses to the request signals as provided by a control module of the local SOC to be returned to the bridge in an order in which the request signals are issued.

A bridge module of a SOC may return write response signals to received non-posted write request signals upon a corresponding interface (e.g., PCIe interface) of the SOC accepting the write request signal from a control module of the SOC. An ordering relationship may be provided between configuration write request signals and configuration read request signals. The interface (or root complex) of the SOC can wait for a response signal to a write request signal before issuing a subsequent read request signal to maintain correct ordering between the write request signal and the read request signal.

A bridge module may allow outbound non-posted write request signals to block subsequent outbound write request signals. Blocking includes preventing a signal from further progressing in a network and/or from being further processed. When the interface of the bridge has transmitted the outbound non-posted write request signals, the subsequently received outbound write request signals may be transmitted. This assures completion of the non-posted write request signals.

In one implementation, a bridge module splits posted write request signals and non-posted write request signals. Posted write request signal are given a first identifier (e.g., first AXI-ID). Non-posted write request signals are given a second identifier (e.g., second AXI-ID). A non-posted write request signal is followed by a read request signal with a same identifier (ID) as the non-posted write request signal to assure completion of a write request associated with the non-posted write request signal. The write response signals are transmitted upon acceptance by an interface of the posted write request signals.

Figure 8:
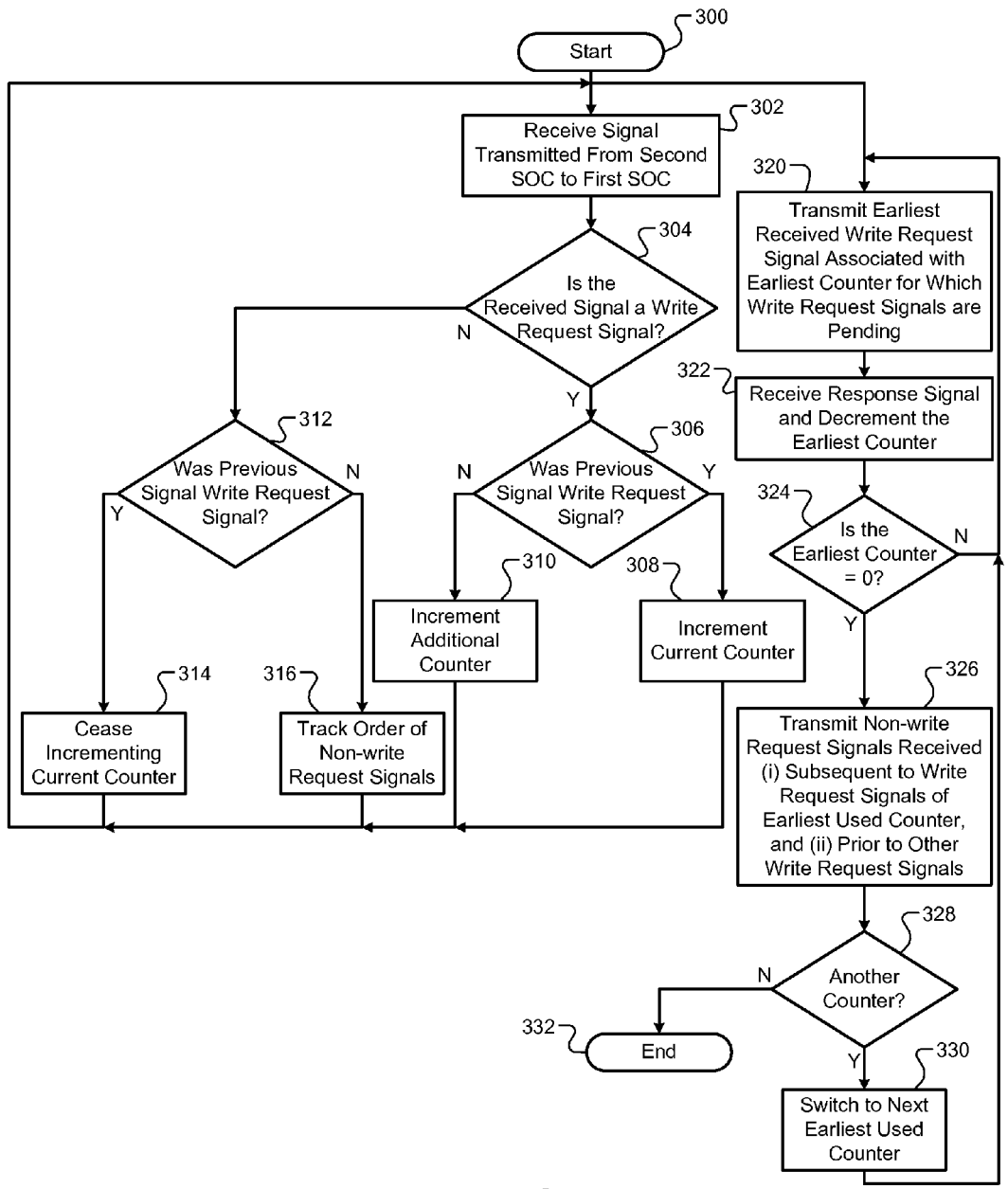
FIG. 8 illustrates an intra-chip bi-domain inbound communication method in accordance with the present disclosure.

The bridge modules disclosed herein may be operated using numerous methods, example methods are provided by the methods of FIGS. 7-8. FIG. 7 illustrates an intra-chip bi-domain outbound communication method. Although the following tasks are primarily described with respect to the implementations of FIGS. 1-6, the tasks may be easily modified to apply to other implementations of the present disclosure. The tasks may be iteratively performed. The method of FIG. 7 may begin at 260.

At 262, a first control module (e.g., one of control modules 22, 80, 132, 246 of FIGS. 1-3 and 6) of a first SOC generates a first request signal in a first domain (e.g., AXI domain). As an example, the first request signal may be a write request signal. The write request signal may be a request to write data in memory (e.g., one of memories 34, 92, 142 of FIGS. 1-3) of a second SOC. This may include accessing a first memory of the first SOC to access data to be written to the second memory in the second SOC. The first control module may directly access the first memory or may access the first memory via a first network within the first SOC.

At 264, the first control module transmits the first request signal on a first channel to a first interface (e.g., first PCIe interface).

At 266, a bridge module (e.g., one of the bridge modules 52, 102, 156, 224 of FIGS. 1-3 and 6) in the first SOC receives and accepts the first request signal and/or detects that the first request signal has been received and accepted by the first interface and generates a first response signal. In detecting that the first interface has accepted the first request signal, the bridge module determines that the first request signal has been handed over to a second domain (e.g., PCIe domain). This can assure that the first request signal is transmitted to the second interface prior to other subsequent request signals.

At 268, the first interface and/or bridge module transmits the first response signal to the first control module in response to detecting reception of the first request signal, acceptance of the first request signal, and/or when the first request signal is to be transmitted from the first interface to a second interface of the second SOC. Waiting until the first request signal has been transmitted to the second interface, assures that the first request signal is transmitted to the second interface prior to other subsequent request signals. The first response signal may be transmitted to the first network and/or the first control module on a second channel that is different than the first channel.

At 270, the first control module receives the first response signal and generates a second request signal (e.g., a read request signal). The second request signal may be transmitted from the first control module to the first network and the first interface on a third channel that is different than the first and second channels. Transmitting the second request signal subsequent to receiving the first response signal can assure that the data of the first request signal is written in the second memory prior to the same data being read back from the second memory, as requested by the second request signal.

At 272, the first control module transmits the second request signal to the first interface. At 274, the bridge module receives and accepts the second request signal and/or detects that the second request signal has been received and accepted by the first interface and may generate a second response signal.

At 276, the first interface and/or bridge module may transmit the second response signal to the first control module in response to detecting reception of the second request signal, acceptance of the second request signal and/or when the second request signal is to be transmitted from the first interface of the first SOC to the second interface of the second SOC.

At 278, the second interface of the second SOC receives the first request signal. Task 278, may be performed prior to one or more of tasks 272-276. At 280 and if the first request signal is a write request signal, the second interface and/or a second control module of the second SOC may write the data provided in the first request signal to a predetermined address of the second memory in the second SOC. The predetermined address may have been determined by the first control module, the first interface, the second interface, and/or the second control module.

At 282, the second interface receives the second request signal subsequent to receiving the first request signal. At 284, the second interface, a second bridge module of the second interface, and/or the second control module may read the second memory if the second request signal is a read request signal. The predetermined address may be read if the second request signal indicates reading the predetermined address and/or the data written during task 280. At 286, the first interface transmits read completion data obtained from reading the predetermined address back to the first interface.

At 288, the first interface receives the read completion data and forwards the read completion data to the first control module. The first control module may then, for example, evaluate the read completion data and/or second memory by comparing the read completion data to the data written to the predetermined address. Errors in the read completion data may be detected based on differences between the read completion data and the data original written to the predetermined address. Task 262 may be performed subsequent to task 288 or the method may end at 290, as shown. Tasks 280, 284, 286, and/or 288 may not be performed depending upon whether the first and second request signals are respectively a write request signal and a read request signal.

The above tasks of FIG. 7 that are performed by the bridge module may be performed while following one or more of the bi-domain ordering rules in Tables 1 and 2.

FIG. 8 illustrates an intra-chip inbound bi-domain communication method. Although the following tasks are primarily described with respect to the implementations of FIGS. 1-6, the tasks may be easily modified to apply to other implementations of the present disclosure. The tasks may be iteratively performed. The method of FIG. 8 may begin at 300 and includes two parallel performed processes. The first process includes tasks 302-316 and includes (i) tracking inbound signals received by a first interface (e.g., one of the interfaces 28, 86, 138 and 222 of FIGS. 1-3 and 6) of a first SOC from a second SOC (e.g., one of the SOCs 18, 74, 128 of FIGS. 1-3), and (ii) providing respective counters for each series of consecutive write request signals received by the first interface from the second SOC. The second process includes tasks 320-332 and includes (i) decrementing the counters as the write request signals are transmitted from a first interface of a first SOC to a first control module of the first SOC, and (ii) transmitting non-write request signals (e.g., read request signals or read completion data signals) in an order in which the non-write request signals are received.

At 302, the first interface of the first SOC receives and buffers a signal received from the second interface of the second SOC. The signal may be a write request signal, a read request signal, or a read completion data signal.

At 304, a bridge module, an ordering module, and/or an inbound module of the first interface determines whether the signal received at 302 is a write request signal. If the signal is a write request signal task 306 is performed, otherwise task 312 is performed.

At 306, the bridge module, the ordering module, and/or the inbound module of the first interface determines whether a previous signal received prior to the signal received at 302 was a write request signal. If the previous signal was a write request signal, task 308 is performed, otherwise task 310 is performed. At 308, a first (or current) counter is incremented. The counter indicates a number of consecutive write request signals that have been received.

At 310, an additional counter (a counter different than the counter used at 308) is incremented. The additional counter is used as the last received signal is the beginning of another series of one or more write request signals. This series of write request signals is different than the series of write request signals associated with the counter used previously at 308. The additional counter is then used as the counter at 308 during a subsequent iteration of tasks 302-308.

At 312, the bridge module, the ordering module, and/or the inbound module of the first SOC determines whether a previous signal received prior to the signal received at 302 is a write request signal, as determined at 304. If the previous signal was a write request signal, task 314 is performed, otherwise task 316 is performed.

At 314, the bridge module, the ordering module, and/or the inbound module ceases to increment the current counter and returns to task 302. At 316, the bridge module, the ordering module, and/or the inbound module may track order of non-write request signals received since the last write request signal of the current counter. This may include tracking identifiers (IDs), such as AXI-IDs of the non-write request signals and the order in which non-write request signals having different identifiers are received. Task 302 may be performed subsequent to task 316.

At 320, the first interface transmits an earliest received write request signal associated with an earliest used counter for which write request signals are pending. The write request signal is transmitted to the first control module and/or the first memory. The write request signal may be issued as non-bufferable. This may include transmitting the write request signal to the first control module and/or first memory based on whether a response signal has been received and accepted by the first control module and/or first memory for a previously transmitted signal. The previously transmitted signal may have been transmitted from the first interface to the first control module and/or first memory prior to the write request signal. The previously transmitted signal may be a write request signal, a read request signal and/or a read completion data signal.

At 321, the first control module and/or first memory may transmit a response signal to the write request signal transmitted at 320. This may be performed regardless of whether the write request signal is a posted or non-posted signal. At 322, the bridge module, the ordering module, and/or the inbound module decrements the earliest used counter for which write request signals are pending. At 324, the bridge module, the ordering module, and/or the inbound module determines whether earliest used counter is equal to zero. If the earliest used counter is equal to zero, task 326 is performed, otherwise task 320 is performed.

At 326, non-write request signal are transmitted. The non-write request signals are signals received subsequent to the write request signals (i) associated with the earliest used counter, and (ii) received prior to other write request signals. The non-write request signals may be transmitted from the first interface in the first control module and/or first memory in the order in which the non-write request signals were received by the first interface. This may be performed based on the identifiers of the non-write request signals and the order in which the non-write request signals having different identifiers were received. For example, non-write request signals associated with a first identifier may be transmitted prior to non-write request signals associated with a second identifier. The non-write request signals associated with the first identifier were received prior to the non-write request signals associated with the second identifier. Non-write request signals associated with the same identifier are transmitted in the order in which the non-write request signals were received by the first interface.

At 328, the bridge module, the ordering module, and/or the inbound module determines whether there is another counter with associated pending write request signals. If there is another counter, task 330 is performed, otherwise the method may end at 332. At 330, the bridge module, the ordering module, and/or the inbound module switches to a next counter and then returns to task 320.

By performing tasks 320-330, signals (e.g., non-write request signals) received subsequent to an earliest received and pending set of write request signals are blocked until the earliest received and pending set of write request signals are transmitted and/or a corresponding counter decrements to zero. The non-write request signals a held in a holding buffer (e.g., one of the outbound buffers disclosed herein) until the corresponding counter decrements to zero. This prevents non-write request signals from overtaking earliest received and pending write request signals. The non-write request signals are then permitted to proceed when the corresponding counter decrements to zero.

The above tasks of FIG. 8 may performed by the first bridge module while following one or more of the bi-domain ordering rules in Tables 1 and 2.

The above-described tasks of FIGS. 7 and 8 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system on a chip comprising:
   a network comprising one or more devices, wherein the network is configured to operate in a first domain, and wherein communication in the first domain is based on a first set of read and write ordering rules;
   an interface connected between the network and a second chip, wherein communication between the interface and the second chip is in a second domain, wherein communication in the second domain is based on a second set of read and write ordering rules, wherein the second set of read and write ordering rules are different than the first set of read and write ordering rules; and
   a bridge module configured to map communication transactions between the first domain and the second domain, wherein the communication transactions include posted write request transactions and non-posted write request transactions, and wherein the bridge module is configured to (i) permit the posted write request transactions to overtake the non-posted write request transactions, and (ii) prevent the non-posted write request transactions received from the second chip from overtaking each other.

2. The system on a chip of claim 1, wherein:
   the first domain is at least one of an advanced microcontroller bus architecture domain and an advanced extensible interface domain; and
   the second domain is a peripheral component interconnect express domain.

3. A system on a chip comprising:
   a network comprising one or more devices, wherein the network is configured to operate in a first domain, and wherein communication in the first domain is based on a first set of read and write ordering rules;
   an interface connected between the network and a second chip, wherein communication between the interface and the second chip is in a second domain, wherein communication in the second domain is based on a second set of read and write ordering rules, wherein the second set of read and write ordering rules are different than the first set of read and write ordering rules;
a bridge module configured to map communication transactions between the first domain and the second domain; and
a control module configured to (i) generate a first request transaction and a second request transaction, and (ii) transmit the first request transaction and the second request transaction to the interface via the network,
wherein
the bridge module is configured to transmit a response transaction to the control module when at least the first request transaction is accepted by the interface or the first request transaction is transmitted from the interface to the second chip, and
the control module is configured to generate the second request transaction subsequent to the first request transaction, and in response to the response transaction.

4. The system on a chip of claim 1, wherein:
the communication transactions include write request transactions and read request transactions; and
the bridge module is configured to (i) prevent the write request transactions from overtaking each other, and (ii) prevent the read request transactions from overtaking each other.

5. The system on a chip of claim 1, further comprising a control module, wherein:
the interface is configured to receive a plurality of read request transactions from either the second chip or the control module;
the plurality of read request transactions comprise
a first read request transaction having associated first read completion data, and
a second read request transaction having associated second read completion data,
wherein the interface receives the first read completion data prior to the second read completion data, and
wherein the first read completion data and the second read completion data are both received from either the control module or the second chip; and
the bridge module is configured to prevent the first read completion data from overtaking the second read completion data.

6. A network device comprising:
the system on a chip of claim 1; and
the second chip.

7. A network device comprising the system on a chip of claim 1, wherein:
the network device is separate from a second network device and is in communication with the second network device in the second domain; and
the communication with the second network device in the second domain includes communication with the second chip.

8. The system on a chip of claim 1, wherein:
the communication transactions include write request transactions and read request transactions; and
the bridge module is configured to (i) permit the write request transactions to overtake the read request transactions, and (ii) prevent the read request transactions from overtaking the write request transactions.

9. The system on a chip of claim 3, further comprising a first memory configured to store data, wherein:

the control module is configured to access the data stored in the first memory via the network;
the first request transaction requests data be written to a second memory in the second chip;
the second request transaction requests reading an address of the second memory where the data is written;
the bridge module is configured to transmit a response transaction to the control module when at least the first request transaction is accepted by the interface or the first request transaction is transmitted from the interface to the second chip; and
the control module is configured to generate the second request transaction subsequent to the first request transaction, and in response to the response transaction.

10. The system on a chip of claim 9, wherein the bridge module is configured to transmit a response transaction to the control module when the first request transaction is accepted by the interface.

11. The system on a chip of claim 3, wherein:
the interface comprises the bridge module; and
the bridge module is configured to map communication transactions between the control module and the second chip.

12. A system on a chip comprising:
a memory;
a control module configured to access the memory
a network comprising one or more devices, wherein the network is configured to operate in a first domain, and wherein communication in the first domain is based on a first set of read and write ordering rules;
an interface connected between the network and a second chip, wherein communication between the interface and the second chip is in a second domain, wherein communication in the second domain is based on a second set of read and write ordering rules, wherein the second set of read and write ordering rules are different than the first set of read and write ordering rules, and wherein the interface is configured to receive a plurality of request transactions from the second chip in the second domain; and
a bridge module configured to map communication transactions between the first domain and the second domain, wherein the bridge module comprises
an ordering module configured to determine an order in which the plurality of request transactions are to be transmitted from the interface to the control module, wherein the plurality of request transactions include write request transactions and read request transactions, and
a counter configured to count a number of the write request transactions received from the second chip, wherein the ordering module is configured to (i) permit the write request transactions received from the second chip to be passed to the control module, and (ii) block the read request transactions based on the count of the number of the write request transactions.

13. The system on a chip of claim 12, wherein the read request transactions are received by the interface subsequent to the write request transactions being received by the interface.

14. The system on a chip of claim 12, wherein:
the counter is configured to (i) increment the count of the number of the write request transactions each time one of the write request transactions is received from the second chip at the interface, and (ii) decrement the count of the number of the write request transactions each time one of the write request transactions is passed to the control module; and the ordering module is configured to permit the read request transactions to pass to the control module when the count is equal to zero.

15. The system on a chip of claim 12, wherein:
the counter is configured to decrement the count of the number of the write request transactions each time a response transaction to one of the write request transactions is received from the control module; and
the ordering module is configured to permit the read request transactions to pass to the control module when the count is equal to zero.

16. The system on a chip of claim 12, wherein the ordering module is configured to pass the write request transactions to the control module in an order in which the write request transactions were received from the second chip.

17. The system on a chip of claim 12, wherein:
the interface receives a first request transaction and a second request transaction from the second chip;
the first request transaction is a read request transaction;
the second request transaction is a write request transaction; and
the ordering module is configured to permit the second request transaction to overtake the first request transaction by permitting the second request transaction to pass to the control module independent of whether a response transaction to the first request transaction has been received from the control module.

18. The system on a chip of claim 12, wherein:
the communication transactions include write request transactions and read request transactions; and
the bridge module is configured to (i) permit the write request transactions to overtake the read request transactions, and (ii) prevent the read request transactions from overtaking the write request transactions.

19. The system on a chip of claim 12, wherein:
the communication transactions include write request transactions and read request transactions; and
the bridge module is configured to (i) prevent the write request transactions from overtaking each other, and (ii) prevent the read request transactions from overtaking each other.

20. The system on a chip of claim 12, wherein:
the communication transactions include posted write request transactions and non-posted write request transactions; and
the bridge module is configured to (i) permit the posted write request transactions to overtake the non-posted write request transactions, and (ii) prevent the non-posted write request transactions received from the second chip from overtaking each other.

21. The system on a chip of claim 12, wherein:
the interface is configured to receive a plurality of read request transactions from either the second chip or the control module;
the plurality of read request transactions comprise
a first read request transaction having associated first read completion data, and
a second read request transaction having associated second read completion data,
wherein the interface receives the first read completion data prior to the second read completion data, and
wherein the first read completion data and the second read completion data are both received from either the control module or the second chip; and
the bridge module is configured to prevent the first read completion data from overtaking the second read completion data.

22. A system on a chip comprising:
a first memory configured to store a plurality of write transactions;
a second memory to store a plurality of read transactions;
a control module configured to access the first memory and the second memory;
a network comprising one or more devices, wherein the network is configured to operate in a first domain, and wherein communication in the first domain is based on a first set of read and write ordering rules;
an interface connected between the network and a second chip, wherein communication between the interface and the second chip is in a second domain, wherein communication in the second domain is based on a second set of read and write ordering rules, wherein the second set of read and write ordering rules are different than the first set of read and write ordering rules, and wherein the interface is configured to receive a plurality of request transactions from the second chip in the second domain, wherein the plurality of request transactions comprise the plurality of write transactions and the plurality of read transactions; and
a bridge module configured to map communication transactions between the first domain and the second domain, wherein the bridge module comprises a plurality of counters, each of the plurality of counters is configured to (i) count a respective number of the plurality of write transactions corresponding to each of the plurality of read transactions, and (ii) decrement when a corresponding one of the plurality of write transactions is transmitted to the control module and a write response is returned to the second chip, and wherein the bridge module is configured to transmit each of the plurality of read transactions to the control module when a respective one of the plurality of counters is equal to zero.

23. The system on a chip of claim 22, wherein the bridge module comprises:
a first counter configured to count a number of first write request transactions received from the second chip and prior to receiving a first read request transaction from the second chip;
a second counter configured to count a number of second write request transactions received (i) from the second chip, (ii) subsequent to the first read request transaction, and (iii) prior to a second read request transaction; and
an ordering module configured to (i) pass the first write request transactions to the control module prior to passing the first read request transaction based on the first counter, (ii) pass the first read request transaction prior to passing the second write request transactions, and (iii) pass the second write request transactions prior to passing the second read request transaction based on the second counter.

24. A method comprising:
operating a network within a first chip in a first domain, wherein the network comprises one or more devices, and wherein communication in the first domain is based on a first set of read and write ordering rules;
communicating in a second domain and with a second chip via an interface, wherein the interface is connected between the network and the second chip, wherein communication in the second domain is based on a second set of read and write ordering rules, wherein the second set of read and write ordering rules are different than the first set of read and write ordering rules;

mapping communication transactions between the first domain and the second domain via the first chip, wherein the communication transactions include posted write request transactions and non-posted write request transactions;

permitting the posted write request transactions to overtake the non-posted write request transactions; and preventing the non-posted write request transactions received from the second chip from overtaking each other.

25. The method of claim 24, further comprising:

generating a first request transaction and a second request transaction;

transmitting the first request transaction and the second request transaction to the interface via the network;

transmitting a response transaction to a control module of the first chip when at least the first request transaction is accepted by the interface or the first request transaction is transmitted from the interface to the second chip; and generating, via the control module, the second request transaction subsequent to the first request transaction, and in response to the response transaction, wherein the first domain is at least one of an advanced microcontroller bus architecture domain and an advanced extensible interface domain, and wherein the second domain is a peripheral component interconnect express domain.

26. The method of claim 24, wherein:

the communication transactions include write request transactions and read request transactions, and wherein; and the method further comprises permitting the write request transactions to overtake the read request transactions, preventing the read request transactions from overtaking the write request transactions, preventing the write request transactions from overtaking each other, and preventing the read request transactions from overtaking each other.

27. The method of claim 24, wherein:

the communication transactions include posted write request transactions and non-posted write request transactions; and the method further comprises permitting the posted write request transactions to overtake the non-posted write request transactions, and preventing the non-posted write request transactions received from the second chip from overtaking each other.

28. The method of claim 24, further comprising:

receiving, via the interface, a plurality of read request transactions from either the second chip or a control module of the first chip;

the plurality of read request transactions comprise a first read request transaction having associated first read completion data, and a second read request transaction having associated second read completion data;

receiving, via the interface the first read completion data prior to the second read completion data, wherein the first read completion data and the second read completion data are both received from either the control module or the second chip; and preventing the first read completion data from overtaking the second read completion data.

29. A method comprising:

operating a network within a first chip in a first domain, wherein the network comprises one or more devices, and wherein communication in the first domain is based on a first set of read and write ordering rules;

communicating in a second domain and with a second chip via an interface, wherein the interface is connected between the network and the second chip, wherein communication in the second domain is based on a second set of read and write ordering rules, wherein the second set of read and write ordering rules are different than the first set of read and write ordering rules;

receiving, via the interface, a plurality of request transactions from the second chip in the second domain;

mapping communication transactions between the first domain and the second domain via the first chip;

determining an order in which the plurality of request transactions are to be transmitted from the interface to a control module of the first chip, wherein the plurality of request transactions include write request transactions and read request transactions;

counting a number of the write request transactions received from the second chip;

permitting the write request transactions received from the second chip to be passed to the control module; and blocking the read request transactions based on the count of the number of the write request transactions.

* * * * *